Dec. 24, 1929.  H. F. GOLDSMITH  1,740,978

CHART

Filed Sept. 26, 1928

WITNESS:

INVENTOR

Henry F. Goldsmith
BY
Busser + Audwig
ATTORNEYS.

Patented Dec. 24, 1929

1,740,978

UNITED STATES PATENT OFFICE

HENRY F. GOLDSMITH, OF PHILADELPHIA, PENNSYLVANIA

CHART

Application filed September 26, 1928. Serial No. 308,479.

This invention relates to a chart particularly adapted for the graphical representation of data.

The object of this invention is the provision of a graphical chart having movable indicating means so that periodic variations may be recorded thereon by simple movement of the indicating means. More specifically the object is to provide a chart having looped about the marked surface thereof a band or a plurality of bands having indicating means which may be brought into predetermined relationship with markings on the surface of the chart. In the modification shown, these bands consist of a plurality of strips of contrasting appearance secured at their ends, the end of one of the strips being adapted to be brought into proper relationship with markings on the chart to give indication of certain data.

Figure 1:
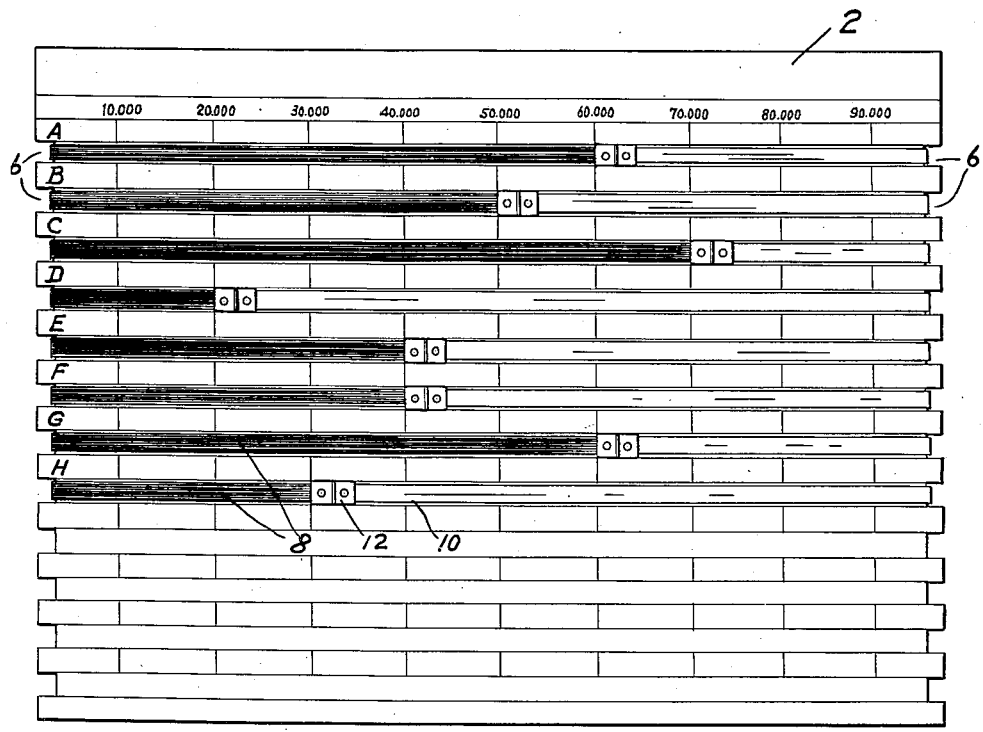
Fig. 1 is a plan view of the improved chart.

The chart consists, in its preferred form, of a plurality of sheets 2 and 4. Preferably sheet 2 is of some material on which markings may be readily made, such as heavy paper, while sheet 4 consists of sheet metal, or the like, to form a rigid backing for sheet 2 and proper support for the bands. Either one or both of the sheets are notched, as indicated at 6, to provide guideways for the indicating bands which consist of strips 8 and 10 of contrasting appearance.

On the front of the chart these bands are secured together by metallic members 12 which include outwardly projecting portions 14 adapted to be grasped by an operator.

Strips 8 and 10 may be secured at the rear of the chart by eyelets 16 or the like. Strip 8, the exposed length of which serves to indicate the value of the data recorded, is preferably inelastic and of a length equal to or greater than the width of the chart so that it may extend completely across the chart. Strip 10 is preferably elastic and tends to hold the band as a whole tightly against the face of the chart.

By making the length of strip 8 equal to the width of the chart the proper appearance when either this strip or strip 10 extends across the front is assured, in the last case, the indication being blank.

In order to properly produce the appearance of a conventional graph, strip 8 is of a dark color contrasting with the face of the chart and with strip 10 which, being of the same color as the chart, is relatively invisible. To enhance the conventional appearance, members 12 may be enamelled the same color as the face of the chart so that the edge of strip 8 stands out with maximum sharpness as an indicator.

Figure 2:
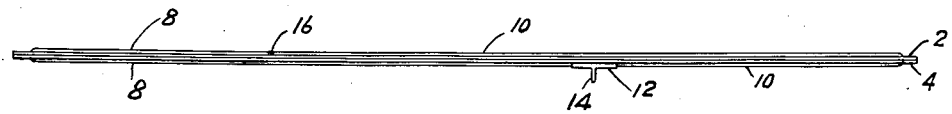
Fig. 2 is an edge view thereof.
Figure 3:
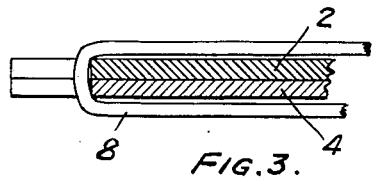
Fig. 3 is an enlarged sectional view of an edge of the chart taken longitudinally of one of the bands.

As shown in Fig. 2, the chart is provided with abscissæ and ordinates representative of certain data. Notches 6 in the opposite edges of the chart are placed in opposed relation so as to bring the bands which are received therein into parallelism with, in the present case, the abscissæ. By moving through the medium of projecting portions 14 the various bands, the dark colored portion 8 will serve to indicate the value of the data represented on the chart, the reading being, in the present case, taken at the extreme right hand visible edge of the strip 8, as shown in Fig. 2.

By reason of their elasticity, the bands serve to snugly engage the face of the chart and may be readily removed therefrom, for example, to other notches if it is not desired to use the whole chart at one time.

What I claim and desire to protect by Letters Patent is:

1. A chart comprising a member having a surface containing markings, an endless flexible elastic looped band extending about the member and arranged to be moved across the surface thereof, said band having indicating means adapted to be brought into predetermined relationship with said markings, and outwardly projecting means on the band adapted to be grasped by an operator to move the band.

2. A chart comprising a member having a surface containing markings, and an endless flexible looped band extending about the member and across the surface thereof, said band consisting of a plurality of strips of contrasting appeareance having their ends secured together.

3. A chart comprising a member having a surface containing markings, and an endless flexible looped band extending about the member and across the face thereof, said band comprising an inelastic strip and an elastic strip, said inelastic strip being of a length equal to the width of the chart, one of said strips contrasting with the face of the chart, and the other of said strips being of an appearance similar to that of the face of the chart.

4. A chart comprising a member having a surface containing markings, and an endless flexible looped band extending about the member and across the face thereof, said band comprising two strips, one of which contrasts in appearance with the face of the chart and the other of which is of an appearance similar to that of the face of the chart.

5. A chart comprising a member having substantially plane front and back surfaces, the former containing markings, and an endless flexible looped band extending about the member and arranged to be moved across the surface thereof, said member having two guiding slots for the band in its edges, the band extending directly from one guiding slot to the other across the front surface of the member and thence directly to the first slot across the back surface of the member, and said band having indicating means moving therewith and adapted to be brought into predetermined relationship with said markings.

6. A chart comprising a member having substantially plane front and back surfaces, the former containing markings, and an endless flexible band looped once only about the member and engaging its edges and arranged to be moved across the surface thereof, said band having indicating means moving therewith and adapted to be brought into predetermined relationship with said markings.

In testimony of which invention, I have hereunto set my hand, at Philadelphia, Pennsylvania, on this 25th day of September, 1928.

HENRY F. GOLDSMITH.